US012557810B2

(12) United States Patent
Gardner et al.

(10) Patent No.: US 12,557,810 B2
(45) **Date of Patent: *Feb. 24, 2026**

(54) AGRICULTURAL APPLICATIONS OF FATTY ACID REACTION PRODUCTS OF DEXTRINS OR DEXTRAN

(71) Applicant: Integrity Bio-Chemicals, LLC, Cresson, TX (US)

(72) Inventors: Christopher P. Gardner, Cresson, TX (US); Stephen William Almond, Creston, CA (US)

(73) Assignee: Integrity Bio-Chemicals, LLC, Cresson, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 18/293,034

(22) PCT Filed: Aug. 18, 2022

(86) PCT No.: PCT/US2022/075107

§ 371 (c)(1),
(2) Date: Jan. 29, 2024

(87) PCT Pub. No.: WO2023/023574

PCT Pub. Date: Feb. 23, 2023

(65) Prior Publication Data

US 2024/0251786 A1 Aug. 1, 2024

Related U.S. Application Data

(60) Provisional application No. 63/234,311, filed on Aug. 18, 2021.

(51) Int. Cl.

| | |
|---|---|
| ***A01N 25/30*** | (2006.01) |
| ***A01N 25/04*** | (2006.01) |
| ***A01N 57/20*** | (2006.01) |
| ***A01P 13/00*** | (2006.01) |

(52) U.S. Cl.

CPC ............ *A01N 25/30* (2013.01); *A01N 25/04* (2013.01); *A01N 57/20* (2013.01); *A01P 13/00* (2021.08)

(58) Field of Classification Search

CPC ........ A01N 25/30; A01N 25/04; A01N 57/20; A01N 25/02; A01P 13/00; C05G 3/50; C09K 17/18

See application file for complete search history.

(56) References Cited

U.S. PATENT DOCUMENTS

| | | | | |
|---|---|---|---|---|
| 7,297,351 | B2 | 11/2007 | Hiromoto | |
| 11,299,667 | B2 * | 4/2022 | Gardner | C09K 8/602 |
| 11,542,429 | B2 * | 1/2023 | Gardner | C09K 8/90 |
| 11,827,844 | B2 * | 11/2023 | Gardner | C11D 3/226 |
| 11,957,777 | B2 * | 4/2024 | Gardner | A61K 8/42 |
| 12,152,193 | B2 * | 11/2024 | Gardner | C11D 11/04 |
| 2010/0160168 | A1 | 6/2010 | Linder | |
| 2011/0294667 | A1 | 12/2011 | Mainx | |
| 2016/0374334 | A1 * | 12/2016 | Di Modugno | A01N 25/30 504/206 |
| 2020/0178520 | A1 * | 6/2020 | Anderson | A01N 37/46 |

FOREIGN PATENT DOCUMENTS

| | | | | |
|---|---|---|---|---|
| JP | 2017071588 A | 4/2017 | | |
| WO | WO-2018141913 A1 * | 8/2018 | | A01N 25/30 |

OTHER PUBLICATIONS

Calum J. Drummond, Celesta Fong, Irena Krodkiewska, Ben J. Boyd and Irene J. A. Baker, "Sugar fatty acid esters", Surfactant science series (2003): 95-128 (Year: 2003).*

Sunsanee Udomrati, Nopparat Cheetangdee, Shoichi Gohtani, Vipa Surojanametakul and Supakchon Klongdee, "Emulsion stabilization mechanism of combination of esterified maltodextrin and Tween 80 in oil-in-water emulsions", Food Science and Biotechnology (2020) 29(3):387-392 (Year: 2020).*

Yan Zheng, Minying Zheng, Zonghui Ma, Benrong Xin, Ruihua Guo, and Xuebing Xu, "Sugar fatty acid esters", Polar lipids, pp. 215-243. Elsevier, 2015. (Year: 2015).*

Written Opinion and International Search Report from corresponding PCT Application No. PCT/US2022/075107 mailed Nov. 30, 2022.

Zhang, K. et al., "Synthesis of long-chain fatty acid starch esters in aqueous medium and its characterization.", European Polymer Journal, 2019, vol. 119, pp. 136-147.

Wang, Hong-Rong et al., Preparation and surface active properties of biodegradable dextrin derivative surfactants, Colloids and Surfaces A: Physicochemical and Engineering Aspects, vol. 281, Issues 1-3, 2006, pp. 190-193.

(Continued)

*Primary Examiner* — Mina Haghighatian

*Assistant Examiner* — Nathan W Schlientz

(74) *Attorney, Agent, or Firm* — Vorys, Sater, Seymour and Pease LLP

(57) ABSTRACT

An agricultural product may comprise an aqueous carrier phase, a neutral surfactant or a reaction product thereof, and a reaction product of a saccharide polymer and a fatty acid. The reaction product of the saccharide polymer may be obtained in the presence of water and a hydroxide base (optionally in the presence of the neutral surfactant). The saccharide polymer comprises a dextran, a dextrin compound, or any combination thereof. The reaction product of the saccharide polymer and the fatty acid may be present at a concentration effective to lower surface tension of the neutral surfactant and may be highly biodegradable as evaluated by OECD 301B. Compositions comprising the reaction product of the saccharide polymer and the fatty acid may be applied to an untreated soil to form a treated soil that absorbs water faster or to a greater extent than does the untreated soil.

19 Claims, 2 Drawing Sheets

(56) References Cited

OTHER PUBLICATIONS

Kaewprapan, Kulthida et al., Macromolecular surfactants synthesized by lipase-catalyzed transesterification of dextran with vinyl decanoate, Carbohydrate Polymers, vol. 88, Issue 1, 2012, pp. 313-320.

Park, Namhyeon et al., Physical and emulsion stabilizing properties of maltodextrin fatty acid polymers produced by lipase-catalyzed reactions in ethanol, Carbohydrate Polymers, vol. 226, 2019, 115309.

* cited by examiner

AGRICULTURAL APPLICATIONS OF FATTY ACID REACTION PRODUCTS OF DEXTRINS OR DEXTRAN

BACKGROUND

Amphiphilic compounds having both hydrophobic and hydrophilic regions within their molecular structure are commonly referred to as "surfactants" or "surfactant compounds." By virtue of their molecular structure, surfactants tend to lower the surface tension at an interface between two components. Surfactants may be found in a wide range of consumer and industrial products including, for example, soaps, detergents, cosmetics, pharmaceuticals, and dispersants. Among other functions in these applications and others, surfactants may promote solubility of an otherwise sparingly soluble solid, improve dispersion of a solid, increase foaming, facilitate emulsification or de-emulsification, increase surface wetting, and/or lower viscosity in particular instances.

There are difficulties associated with various conventional surfactants. Some common synthetic surfactants may exhibit poor biodegradation, including slow biodegradation in liquid environments, and be subject to environmental or government regulations concerning their use, which may hamper their incorporation in products of various types that might otherwise benefit from surfactant incorporation. In addition, some surfactants may exhibit high surface tension or intrafacial tension values at the critical micelle concentration, which may complicate formulation thereof in consumer and industrial products of various types. A further difficulty associated with conventional surfactants is that the hydrophilic-lipophilic balance (HLB) is fixed by virtue of the molecular structure of a particular amphiphilic compound employed, which is not readily altered without developing an entirely new chemical synthesis for a different chemical entity.

Surfactants may be utilized in soil conditioning and other agricultural applications as well. When utilized for soil conditioning, the surfactant may increase wetting of the soil, thereby allowing water to permeate the soil more easily and promote plant growth therein. Surfactants may further facilitate water retention within soil as well. Other applications of surfactants in the agricultural space include dispersion of pesticides, fertilizers, and like agricultural compounds in aqueous media. Like other situations in which surfactants are used, issues of biodegradation and sub-optimal performance may hamper the use of surfactants in agricultural applications.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

DETAILED DESCRIPTION

Figure 1:
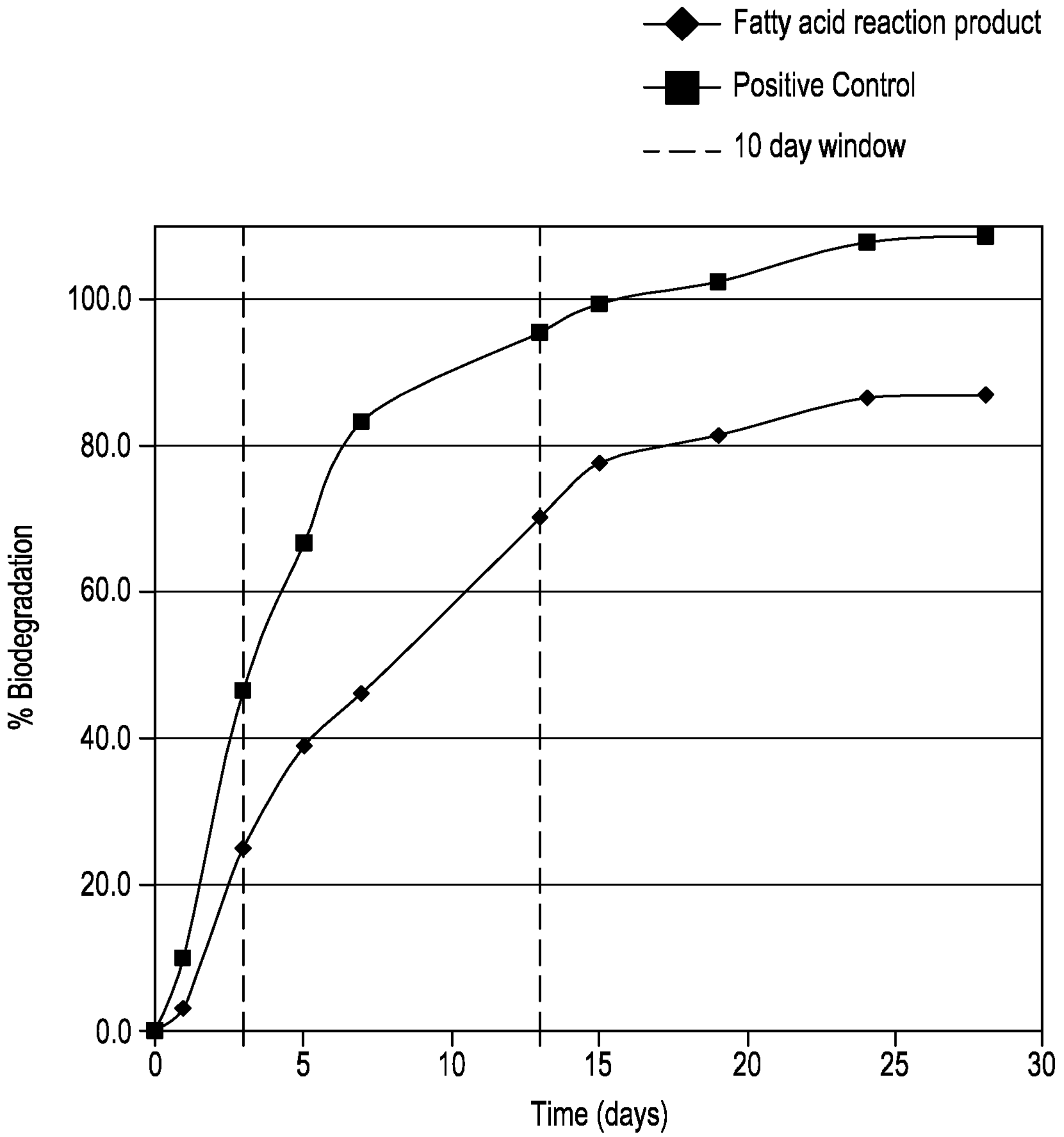
FIGS. 1 and 2 show plots of percent biodegradation as a function of time, as measured by OECD 301B, for reaction products of maltodextrin with a fatty acid.

The present disclosure generally relates to agricultural products and methods employing surfactants and, more specifically, agricultural products comprising surfactants that are highly biodegradable and may promote a low surface tension and methods associated therewith.

Surfactants are routinely utilized in agricultural products and methods. However, some surfactants may be expensive, have incompatibilities with other materials, promote high surface tension values, exhibit limited biodegradability, and/or be subject to regulatory constraints. Moreover, there is no easy way to alter the hydrophobic-lipophilic balance (HLB) of conventional surfactants. If the HLB of a given surfactant is ineffective for a specified application, an otherwise chemically compatible surfactant may be rendered unsuitable for a given set of anticipated use conditions.

Surfactants based upon saccharide polymers may alleviate these difficulties, as discussed hereinafter. Such surfactants may be referred to as biopolymer-based compounds herein. Biopolymer-based compounds suitable for use in agricultural applications may be produced through reaction of a saccharide polymer, such as a dextran and/or a dextrin compound, with a fatty acid (or a fatty acid directly liberated from a fatty ester, or via a direct reaction with a fatty ester) to afford reaction products that may exhibit decreased surface tension when combined with a suitable neutral surfactant. Fatty esters, such as glycerol esters, may be reacted with the saccharide polymers in a similar manner. Saccharide polymers comprising a dextran and/or a dextrin compound that are reacted with fatty acids or fatty esters, preferably under alkaline conditions and optionally in the presence of the neutral surfactant, may afford reaction products having surfactant properties and unexpectedly low surface tension values, when present in combination with the neutral surfactant or a reaction product form thereof. The reaction product of the saccharide polymer may be advantageous due to its biological origin, which may make the reaction products suitable for contacting crops for human consumption or other types of plants to which humans are routinely exposed. The reaction products may be classified as highly biodegradable according to OECD 301B in some instances.

Because the foregoing reaction products are derived from materials that are naturally sourced in most cases, such biopolymer-based surfactants may be especially desirable when environmental or government regulations may preclude the use of other types of surfactants, such as within agricultural products and methods. Not only is the hydrophilic-lipophilic balance readily alterable by varying the identity and amount of the fatty acid, but surprisingly low surface tension values may be realized when the reaction product is present in combination with the neutral surfactant by virtue of a synergistic interaction therebetween. Specifically, when the reaction product of the fatty acid and the saccharide polymer is present in combination with a suitable neutral surfactant, the surface tension may be lower than that of the neutral surfactant by itself at substantially the same concentration in an aqueous fluid.

As used herein, the term "fatty acid" refers to a linear, branched, or cyclic, optionally unsaturated, carboxylic acid containing 4 or more carbon atoms. As used herein, the term "fatty ester" refers to a compound containing one or more ester moieties, which comprises an alcohol component and a fatty acid component. The alcohol component may be a monohydric alcohol or a polyhydric alcohol, such as a diol or triol (e.g., glycerol). The fatty acid component of such fatty esters may be a straight chain, saturated or unsaturated fatty acid, examples of which are provided hereinbelow. The reaction products and compositions and products described herein may contain very low amounts (<5 wt. %) or be free of branched fatty acids or products formed therefrom, according to various embodiments. Thus, in some embodiments, the reaction products and aqueous compositions described herein may include one or more fatty acids or products formed therefrom that consist of one or more straight chain fatty acids. In other instances, at least some branched fatty acids or products formed therefrom may be present, typically in combination with one or more straight chain fatty acids or products formed therefrom. Typically, straight-chain fatty acids constitute a majority of the fatty acids.

Without being limited by theory, the reaction products may include at least one fatty ester of the dextran or dextrin compound. The reaction products may interact synergistically with a neutral surfactant to afford especially low surface tension values. Components forming the reaction products individually tend to raise surface tension values, but once all combined together in a reaction product may surprisingly lower the surface tension of cocamide diethanolamine (CocoDEA) and similar alkanolamide neutral surfactants, possibly after further reaction of a primary alcohol functionality of the neutral surfactant. Similar neutral surfactants having primary alcohol functionalities that may function in a like manner to CocoDEA and other cocamide-based surfactants include, but are not limited to, other fatty acid alkanolamides, such as those formed from palmitic acid and ethanolamine, diethanolamine, isopropanolamine, or diisopropanolamine, for example.

Dextrin compounds have primary alcohol functionalities, as well as secondary alcohol functionalities, that may undergo a reaction with a fatty acid under suitable conditions to form a reaction product. Dextrans have secondary alcohols that may undergo a reaction to form a reaction product. The chain length of the fatty acid component of the reaction products may aid in tailoring the properties obtained therefrom in a given circumstance, such as through alteration of the hydrophobic-lipophilic balance (HLB). The amount of fatty acid incorporated in the reaction products may also tailor the HLB. Reaction products having a sufficiently high HLB may promote foaming in some circumstances. Reaction products of maltodextrin represent a class of dextrin-based reaction products.

The combination of a neutral surfactant and reaction products of the present disclosure may promote ready foaming of an aqueous fluid, and may afford a more stable foam than does a comparable mass of cationic, anionic, or zwitterionic surfactant alone. A zwitterionic surfactant may optionally be combined with the reaction products to improve foaming performance relative to the reaction products and a neutral surfactant alone. For example, when combined with CocoDEA, other fatty acid alkanolamides or a reaction product thereof, a reaction product formed from maltodextrin and lauric acid may generate a less dense and more stable foam than does a substantially equivalent amount of sodium lauryl sulfate (sodium dodecyl sulfate), an anionic surfactant that is commonly used in various commercial products. Given the biomolecule nature of the reaction products, foamed or foamable formulations comprising one or more reaction products of the present disclosure may offer the potential for formulating foamed agricultural products for use in various applications. At the very least, the reaction products of the present disclosure may allow decreased amounts of conventional surfactants, such as zwitterionic surfactants, to be present when forming foamed products. Additional advantages may also be realized by combining a zwitterionic surfactant with the reaction products and a neutral surfactant in some cases.

In addition to affording foamed or foamable formulations based upon neutral surfactant technology, the reaction products of the present disclosure may fully or partially replace more costly surfactants and/or surfactants in various agricultural products. For example, the reaction products of the present disclosure may be an effective replacement for ethoxylated alcohol neutral surfactants. The lowering of surface tension afforded by the reaction products of the present disclosure in combination with a neutral surfactant may be advantageous when replacing a less desirable surfactant.

Maltodextrins represent advantageous saccharide polymers for use in the disclosure herein in terms of their low cost, environmentally benign nature, and the relative ease with which they may be chemically reacted with fatty acids having a range of chain lengths. Depending on the fatty acid reacted with a maltodextrin and the amount reacted, the hydrophobic-lipophilic balance (HLB) of the reaction products may range from about 5 to about 20 or more, wherein known molecular contributions may be utilized to calculate the HLB value. Thus, maltodextrin reaction products may be effective for forming emulsions in substantially water-based fluids or substantially oil-based (organic) fluids, depending on the desired application. In addition to the property variation resulting from the fatty acid size, maltodextrins are available in a range of oligomer sizes (e.g., 3-20 glucose monomers, or even up to about 25 glucose monomers), which may allow some further tailoring of the emulsifying or foaming properties to be realized. As such, maltodextrin reaction products may offer numerous advantages and a wide range of applicability for agricultural applications and products. Dextran reaction products may offer similar advantages and features to those of maltodextrin reaction products and may facilitate use in agricultural applications under similar conditions.

Dextrin compounds suitable for use in the present disclosure may comprise 2 to about 20 glucose monomers, or even up to about 25 glucose monomers, linked together with $\alpha(1,4)$ glycosidic bonds. At least a portion of the glucose monomers may form a reaction product upon being contacted under suitable conditions with a fatty acid salt, such as a salt of a $C_4$-$C_{30}$ fatty acid or a $C_4$-$C_{20}$ fatty acid. Without being limited by theory, at least a portion of the glucose monomers may react to form a fatty ester of the dextrin compound in some embodiments, optionally present in combination with unreacted fatty acid salt in an aqueous phase. When formed, an ester reaction product may form at any hydroxyl group of the dextrin compound, including any combination of primary and/or secondary hydroxyl groups. Hydroxyl groups upon the neutral surfactant may undergo a reaction under similar conditions.

Dextran is a saccharide polymer characterized by predominantly $\alpha(1,6)$ glycosidic bonds between adjacent glucose monomers, with a limited number of glucose side chains linked to the main polymer backbone via $\alpha(1,3)$ glycosidic bonds. The $\alpha(1,3)$ glycosidic bonds may introduce crosslinks between adjacent saccharide polymer chains. Depending on the biological source, the extent of branching and the molecular weight of dextran may vary considerably, any of which may be utilized in the disclosure herein. At least a portion of the glucose monomers in dextran may form a reaction product upon being contacted under suitable conditions with a fatty acid salt, such as salt of a $C_4$-$C_{30}$ fatty acid or a $C_4$-$C_{20}$ fatty acid. Without being limited by theory, at least a portion of the glucose monomers may react to form a fatty ester of the dextran in some embodiments, optionally present in combination with unreacted fatty acid salt in an aqueous phase. When formed, an ester reaction product may form at any hydroxyl group of the dextran.

In some embodiments, reaction products of the present disclosure may include a dextrin compound having 3 to about 20 glucose monomers, or even up to about 25 glucose monomers, that are covalently linked by α(1,4) glycosidic bonds. Formula 1 below shows the generic structure of a dextrin compound having only α(1,4) glycosidic bonds between adjacent glucose monomers, wherein variable ‘a’ is a positive integer ranging from 1 to about 18, thereby providing a dextrin backbone with 3 to about 20 glucose monomers. In the case of a dextrin compound containing up to 25 glucose monomers, variable ‘a’ may range from 1 up to about 23. The terminal glucose unit is shown in its closed form, but may also be present in the corresponding reducing sugar form as well.

Suitable dextrans may have a molecular weight of about 1200, or about 1400, or about 5000 up to about 50,000,000 or about 100,000 up to about 20,000,000. As such, variable ‘b’ may range from about 30 to about 300,000 depending on the particular dextran selected. Particularly suitable dextrans may have a molecular weight (e.g., $M_n$) ranging from about 1200 to about 1400, or about 1100 to about 1500, or about 100,000 to about 1 million, or about 2 million to about 5 million. Another particularly suitable dextran may have a molecular weight of about 500,000 and an activity level of about 9%.

Formula 1

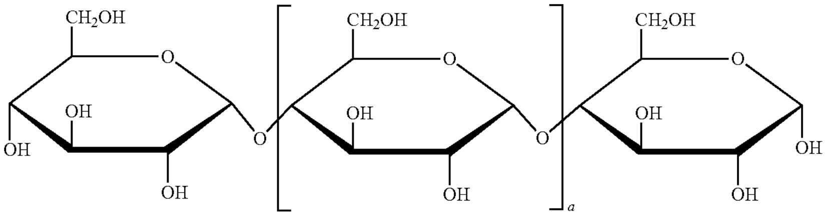

Other dextrin compounds may contain only α(1,6) glycosidic bonds or a mixture of α(1,4) and α(1,6) glycosidic bonds, and such dextrin compounds may also be suitable for use in forming the reaction products. Particularly suitable dextrins may have a molecular weight (e.g., $M_n$) in the range of about 1200 to about 1400 or about 1100 to about 1500.

In some or other embodiments, the reaction products may include a dextran obtained from any suitable source. The structure of dextran is shown in Formula 2 below, in which the α(1,3) glycosidic bonds are not shown in the interest of clarity. Where they occur, the α(1,3) glycosidic bonds may append a terminal glucose monomer as a side chain to the α(1,6)-linked saccharide polymer backbone, form crosslinks between adjacent α(1,6)-linked saccharide polymer backbones, interrupt the α(1,6)-linked saccharide polymer backbone with an α(1,3) glycosidic bond, or any combination thereof. Depending on source, up to about 5% of the glucose monomers may be linked by α(1,3) glycosidic bonds. Linkage by α(1,3) glycosidic bonds may occur upon any of the glucose monomers. The numbering of a single glucose monomer is shown in Formula 3 below.

Formula 2

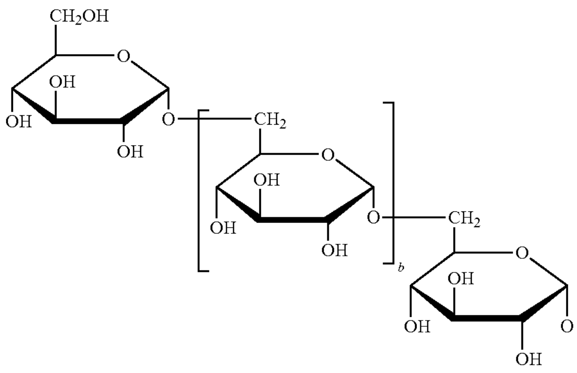

Formula 3

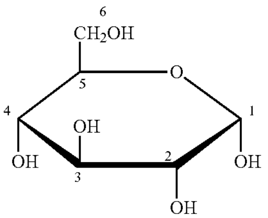

Alternately, other examples of saccharide polymers that may be utilized to form the reaction products of the present disclosure include, but are not limited to, glycogen, guar, xanthan, welan, scleroglucan, chitosan, schizophyllan, levan, pectins, inulin, arabinoxylans, pullulan, gellan, carrageenan, chitosan, chitin, cellulose, starch, or a combination thereof. Saccharide polymer fragments obtained from any of the foregoing and containing about 3 to about 25 monomers per fragment may also be utilized for forming the reaction products used as well. Although the following description is largely directed to dextrin compounds and dextran polymers, and how such saccharide polymers may form a reaction product with a fatty acid or fatty ester for use in an agricultural product or agricultural method, it is to be appreciated that the foregoing saccharide polymers may form alternative reaction products in a similar manner that may also be suitable for use in the disclosure herein.

The saccharide polymer may comprise a maltodextrin according to some embodiments of the present disclosure. Maltodextrins may be characterized in terms of their dextrose equivalent (DE) value. Dextrose equivalent is a measure of the amount of reducing sugars (e.g., glucose monomers) that are present in a saccharide polymer, particularly a dextrin, expressed as a percentage relative to dextrose. Starch, which is functionally non-reducing, has a defined dextrose equivalent of 0, whereas dextrose itself has a dextrose equivalent of 100. Dextrose equivalent may be calculated by dividing the molecular weight of glucose by $M_n$ and multiplying the result by 100. Higher dextrose equivalent values are characteristic of a lower number of covalently linked glucose monomers (shorter polymer backbone length, thereby providing a higher relative percentage of terminal reducing sugars). Maltodextrins suitable for forming a reaction product with one or more fatty acids according to the disclosure herein may exhibit dextrose equivalent values ranging from 3 to about 25 or from 3 to about 20. In more specific embodiments, dextrose equivalent values of the maltodextrins may range from about 4.5 to about 7.0, or from about 7.0 to about 10.0, or from about 9.0 to about 12.0.

Maltodextrins suitable for forming a reaction product may be obtained from hydrolysis or pyrolysis of starch, specifically the amylose component of starch, according to some embodiments. A maltodextrin having Formula 1 may be formed by hydrolysis or pyrolysis of amylose, for example. Alternative suitable dextrins may be obtained from hydrolysis or pyrolysis of the amylopectin component of starch, in which case the dextrin may contain α(1,6) glycosidic bonds if the dextrin is obtained through hydrolysis of the amylopectin side chain. Starches from which the dextrins may be subsequently produced may be obtained from any starch source.

Accordingly, reaction products suitable for incorporation in agricultural products or suitable for use in agricultural applications may comprise a first reaction component comprising a saccharide polymer selected from a dextran, a dextrin compound, or any combination thereof and a second reaction component comprising one or more fatty acids. The reaction products may be obtained in the presence of water and a hydroxide base. Suitable hydroxide bases may include, for example, alkali metal hydroxides, such as sodium hydroxide, potassium hydroxide, or any combination thereof. A stoichiometric excess or a stoichiometric deficit of the hydroxide base relative to the one or more fatty acids may be present. Optionally, the reaction product may be formed in the presence of a neutral surfactant, or a neutral surfactant may be combined with the reaction product after formation thereof.

A molar ratio of fatty acid to glucose monomers in the reaction product may be about 0.05 or above on a basis of $moles_{fatty\ acid}$:$moles_{glucose\ monomers}$, or about 0.08 or above on a basis of $moles_{fatty\ acid}$:$moles_{glucose\ monomers}$, or about 0.1 or above on a basis of $moles_{fatty\ acid}$:$moles_{glucose\ monomers}$, or about 0.2 or above on a basis of $moles_{fatty\ acid}$:$moles_{glucose\ monomers}$, or about 0.3 or above on a basis of $moles_{fatty\ acid}$:$moles_{glucose\ monomers}$, or about 0.4 or above on a basis of $moles_{fatty\ acid}$:$moles_{glucose\ monomers}$, or about 0.5 or above on a basis of $moles_{fatty\ acid}$:$moles_{glucose\ monomers}$, or about 0.6 or above on a basis of $moles_{fatty\ acid}$:$moles_{glucose\ monomers}$, Or about 0.7 or above on a basis of $moles_{fatty\ acid}$:$moles_{glucose\ monomers}$, or about 0.8 or above on a basis of $moles_{fatty\ acid}$:$moles_{glucose\ monomers}$, or about 0.9 or above on a basis of $moles_{fatty\ acid}$:$moles_{glucose\ monomers}$. A maximum ratio of fatty acid to the first saccharide polymer (e.g., a dextrin compound or dextran) in the saccharide polymer reaction product, based upon glucose monomers, may be about 1.0 in most cases, although molar ratios above 1.0 also reside within the scope of the present disclosure. Accordingly, in more specific embodiments, the molar ratio of fatty acid to glucose monomers in the reaction product may be about 0.05 to about 0.9, or about 0.1 to about 0.8, or about 0.05 to about 0.7, each on a basis of $moles_{fatty\ acid}$:$moles_{glucose\ monomers}$. The foregoing ratios may represent a molar ratio of fatty acid reacted with the dextran or dextrin compound. One or more hydroxyl groups per glucose monomer may undergo a reaction in some cases. At least a portion of the glucose monomers may remain unfunctionalized. Unreacted carboxylic acids, if any, may remain in the reaction product as a free carboxylate salt of the hydroxide base. As such, reaction products of the present disclosure may comprise one or more dextrin fatty esters and/or one or more dextran fatty esters, optionally in further combination with a fatty acid carboxylate (e.g., an alkali metal carboxylate), and a hydroxide base (e.g., an alkali metal hydroxide base). The hydroxide base may be present in at least a sufficient molar quantity to react with substantially all of the fatty acid that is present to form an alkali metal carboxylate. If desired, the hydroxide base may be neutralized with an acid or removed through washing, and the reaction products may maintain their ability to afford a low surface tension.

Compositions suitable for formulating an agricultural product or suitable for use in an agricultural application may comprise a neutral surfactant and/or a zwitterionic surfactant in combination with the foregoing reaction products. Surprisingly, the reaction products may promote lowering of the surface tension of the neutral surfactant or zwitterionic surfactant. That is, the reaction product may be present in an effective concentration to lower the surface tension relative to that produced by the neutral surfactant or the zwitterionic surfactant alone at a substantially similar concentration. Neutral surfactants may be useful due to their already low surface tension values. When combined with the saccharide polymer during formation of the reaction product, alcohol groups upon a neutral surfactant may form a reaction product, such as with the fatty acid, as well. The compositions containing a neutral surfactant or a reaction product thereof, and the reaction product of the saccharide polymer and the fatty acid may be formulated with a suitable aqueous carrier phase to afford agricultural products discussed in further detail below.

Suitable neutral surfactants that may have their surface tension lowered in combination with a reaction product include alkanolamide surfactants such as cocamide diethanolamine, cocamide monoethanolamine, cocamide monoisopropanolamine, cocamide diisopropanolamine, and the like. Cocamide diethanolamine (CocoDEA), for instance, may be a suitable neutral surfactant for use in the disclosure herein. Other neutral surfactants that may be suitable include additional fatty acid amide alkanolamines, such as palmitic acid amide diethanolamine or monoethanolamine. In the compositions, such neutral surfactants may be present at a concentration of about 20 wt. % or less, or about 10 wt. % or less, or about 5 wt. % or less, such as about 1 wt. % to about 10 wt. %, or about 3 wt. % to about 8 wt. %. In some embodiments, a reaction product form of the alkanolamide neutral surfactant may be present.

Betaine surfactants are a type of zwitterionic surfactant. Since the net charge of zwitterionic surfactants is zero, they also may be considered to constitute neutral surfactants in the disclosure herein. Zwitterionic surfactants, such as cocamidopropyl betaine, may also be present in the compositions of the present disclosure in some instances, either alone or in combination with a neutral surfactant (e.g., an alkanolamide surfactant), particularly when producing foamable formulations comprising the reaction products. Zwitterionic surfactants may likewise have their surface tension lowered when combined with the reaction products.

Once formed, the pH of the reaction products and compositions formed therefrom may reside within a range of about 1 to about 14, such as a range of about 1 to about 5, or about 5 to about 7, or about 7 to about 9, or about 7 to about 10, or about 9 to about 14. Lower surface tension values may be realized as the pH decreases in some instances. Decreased surface tension may also be realized in the presence of dissolved salt, such as potassium chloride, particularly in dilute aqueous salt solutions, such as about 5 wt. % or below, or about 2 wt. % or below, or about 1 wt. % or below.

Reaction products of a saccharide polymer, which may include those formed through a reaction of one or more fatty acids with dextrin compounds and/or a dextran, may be prepared by a process comprising: heating a saccharide polymer comprising a dextran, a dextrin compound (e.g., comprising 3 to about 20 glucose monomers, or even up to about 25 glucose monomers, linked together with $\alpha(1,4)$ glycosidic bonds), or any combination thereof, a fatty acid and a hydroxide base in water, obtaining a reaction product of the saccharide polymer and the fatty acid in an aqueous phase, and combining a neutral surfactant or optionally a reaction product thereof, such as a cocamide-based surfactant, or a zwitterionic surfactant with the reaction product in the aqueous phase. The reaction product may be combined with the neutral surfactant or zwitterionic surfactant in an amount effective to decrease the surface tension relative to the surfactant alone at a like concentration. Any of the reaction products of a dextran or dextrin compound may constitute a suitable saccharide polymer for forming compositions having a low surface tension. Heating may be conducted at a temperature of about 100° C. or less, such as at about 50° C. to about 80° C., or about 60° C. to about 70° C., or about 50° C. to about 60° C. Once formed, the reaction product may be combined with an agricultural chemical in some instances.

The reaction product may be formed in the presence of the neutral surfactant or zwitterionic surfactant, or the neutral surfactant or zwitterionic surfactant may be combined after formation of the reaction product has been completed. For example, the reaction product may be precipitated and subsequently be redissolved in an aqueous solution containing the neutral surfactant or zwitterionic surfactant. In some embodiments, the reaction products may be formed in the presence of or be combined with a neutral surfactant due to the low surface tension values that may be obtained. When present during formation of the reaction product, a reaction product of a neutral surfactant having hydroxyl groups may be formed.

The reaction products described herein may also be formed by reacting a saccharide polymer with a fatty ester to introduce a fatty acid component of the fatty ester to the saccharide polymer and liberate an alcohol component of the fatty ester into the reaction mixture. Methods for forming the reaction products from a fatty ester may therefore comprise combining the fatty ester, the hydroxide base, and the neutral surfactant in water to form a mixture, and heating the mixture until the fatty ester dissolves (e.g., by undergoing hydrolysis) and a homogeneous mixture forms. The saccharide polymer may be combined with the fatty ester during this process, or the saccharide polymer may be combined with the homogeneous mixture after formation thereof. Once the saccharide polymer is present in the homogeneous mixture, heating may be continued until the reaction product has formed to a sufficient degree. The resulting aqueous phase may be utilized directly in further applications, optionally after concentration, neutralization, or dilution, or by being further combined with additional components targeted for a particular formulation.

When a neutral surfactant is used, surface tension values for the compositions may be about 40 dynes/cm or less, or about 38 dynes/cm or less, or about 36 dynes/cm or less, or about 34 dynes/cm or less, or about 32 dynes/cm or less, or about 30 dynes/cm or less, or about 28 dynes/cm or less. The surface tension may be governed by the amount of neutral surfactant that is present, with the chosen amount of neutral surfactant being selected to provide a desired extent of surfactancy applicable to a given application. At the chosen amount of neutral surfactant, the reaction product may be present in an amount sufficient to lower the surface tension in comparison to the surface tension that would otherwise be obtained for the surfactant alone at a substantially identical concentration. Corresponding intrafacial tension values for the compositions may be about 10 dynes/cm or less.

In forming the reaction products of a saccharide polymer, methods of the present disclosure may comprise combining the fatty acid (or fatty ester), the hydroxide base, and the neutral surfactant and/or zwitterionic surfactant in water to form a mixture, and heating the mixture until the fatty acid (or fatty ester) dissolves and a homogeneous mixture forms. Thereafter, the methods may comprise combining the saccharide polymer with the homogeneous mixture and continuing to heat until the reaction product has formed to a sufficient degree. The resulting aqueous mixture may be utilized directly in further applications, optionally after concentration or dilution, by being further combined with additional components targeted for a particular formulation, such as an agricultural product. Formulations and products in which aqueous mixtures of the reaction products may be utilized are discussed hereinbelow. In some instances, the aqueous mixture may at least partially replace another surfactant in a specific formulation, such as a charged surfactant. In other instances, the aqueous mixture may at least partially replace an ethoxylated alcohol surfactant in a formulation.

Fatty acids suitable for use in forming reaction products of the present disclosure may be selected to afford reaction products having a range of HLB values, such as HLB values of about 5 to about 20. The fatty acids may range in size from about $C_4$ to about $C_{30}$, or about $C_4$ to about $C_{20}$, or about $C_6$ to about $C_{18}$, or about $C_8$ to about $C_{24}$. Suitable fatty acids for forming a reaction product according to the disclosure herein may be straight chain, branched or cyclic, and saturated or unsaturated. Preferably, the fatty acids may contain about 90 wt. % straight-chain fatty acids or above, or about 95 wt. % straight-chain fatty acids or above, or about 99 wt. % straight-chain fatty acids or above having about 4 to about 30 carbon atoms. In some embodiments, the fatty acids may consist essentially of straight-chain fatty acids. In some embodiments, the fatty acids may consist of one or more straight-chain fatty acids having about 4 to about 30 carbon atoms. Illustrative fatty acids that may be suitable for forming a reaction product of the present disclosure include, for example, butyric acid, valeric acid, caproic acid, enanthic acid, caprylic acid, pelabonic acid, capric acid, undecylic acid, lauric acid, tridecylic acid, myristic acid, pentadecylic acid, palmitic acid, margaric acid, stearic acid, nonadecylic acid, arachidic acid, heneicosylic acid, behenic acid, trioscylic acid, lignoceric acid, pentacosylic acid, cerotic acid, carboceric acid, montanic acid, nonacosylic acid, melissic acid, crotonic acid, cervonic acid, linoleic acid, linolelaidic acid, linolenic acid, arachidonic acid, docosatetraenoic acid, myristoleic acid, palmitoleic acid, sappenic acid, vaccenic acid, paullinic acid, oleic acid, pinolenic acid, stearidonic acid, eleostearic acid, elaidic acid, gondoic acid, gadoleic acid, erucic acid, eicosenoic acid, eicosadiencoic acid, eicosatrienoic acid, eicosatetraenoic acid, docosadienoic acid, nervonic acid, mead acid, adrenic acid, the like, and any combination thereof. Lauric acid or a blend of lauric acid and myristic acid may be particularly suitable. Any branched variant of the foregoing fatty acids may also be suitably used to form a reaction product of the present disclosure.

Optionally, the reaction product of the saccharide polymer and the fatty acid may originate by reacting the saccharide polymer with a fatty ester to form the fatty acid. The fatty acid may be liberated in situ and then react with the saccharide polymer, or the fatty ester may undergo direct transesterification with the saccharide polymer to introduce the fatty acid component of the fatty ester onto the saccharide polymer.

Suitable fatty esters for forming reaction products are not believed to be particularly limited, provided that the fatty esters undergo effective hydrolysis to release an alcohol component and one or more fatty acid components of the fatty ester into the aqueous phase. Fatty acids originating from the fatty esters and suitable for forming reaction products of the present disclosure may be selected (through selection of a suitable fatty ester containing one or more desired fatty acids) to afford reaction products having a range of HLB values, such as HLB values of about 5 to about 20. Illustrative fatty esters are provided below. The fatty acids originating from the fatty esters may range in size from about $C_4$ to about $C_{30}$, or about $C_4$ to about $C_{20}$, or about $C_6$ to about $C_{18}$, or about $C_8$ to about $C_{24}$. Illustrative fatty acids that may be liberated from fatty esters and suitable for forming a reaction product of the present disclosure include, for example, butyric acid, valeric acid, caproic acid, enanthic acid, caprylic acid, pelabonic acid, capric acid, undecylic acid, lauric acid, tridecylic acid, myristic acid, pentadecylic acid, palmitic acid, margaric acid, stearic acid, nonadecylic acid, arachidic acid, heneicosylic acid, behenic acid, trioscylic acid, lignoceric acid, pentacosylic acid, cerotic acid, carboceric acid, montanic acid, nonacosylic acid, melissic acid, crotonic acid, cervonic acid, linoleic acid, linolelaidic acid, linolenic acid, arachidonic acid, docosatetraenoic acid, myristoleic acid, palmitoleic acid, sappenic acid, vaccenic acid, paullinic acid, oleic acid, pinolenic acid, stearidonic acid, eleostearic acid, elaidic acid, gondoic acid, gadoleic acid, erucic acid, eicosenoic acid, eicosadiencoic acid, eicosatrienoic acid, eicosatetraenoic acid, docosadienoic acid, nervonic acid, mead acid, adrenic acid, the like, and any combination thereof. Preferably, at least one unsaturated fatty acid, such as oleic, linoleic or linolenic acid, may be present in the reaction product, since the fatty ester may be sourced from plant or animal oils, as discussed further below.

In some embodiments, the fatty ester may comprise a glycerol ester. A glycerol ester may undergo alkaline hydrolysis to liberate glycerol as an alcohol component, and up to three carboxylic acid components per glycerol alcohol component may be released for undergoing reaction with a saccharide polymer according to the disclosure herein. The carboxylic acid components released from the glycerol ester may be the same or different, and at least one unsaturated fatty acid may be among the carboxylic acid components, according to some embodiments of the present disclosure.

Glycerol esters suitable for forming a reaction product in accordance with the disclosure herein are not believed to be particularly limited and may comprise any plant oil, animal oil, plant fat, animal fat, or any combination thereof that contains one or more desired fatty acids. The glycerol ester may undergo hydrolysis or transesterification in the course of forming a reaction product with a saccharide polymer. Suitable glycerol esters may be found in plant or animal sources including, for example, soybean oil, grapeseed oil, olive oil, palm oil, rice bran oil, safflower oil, corn oil, coconut oil, sunflower seed oil, canola oil, rapeseed oil, peanut oil, cottonseed oil, hazelnut oil, tea seed oil, linseed oil, sesame oil, acai oil, almond oil, beech nut oil, brazil nut oil, cashew oil, macadamia nut oil, pecan oil, pine nut oil, pistachio oil, walnut oil, pumpkin seed oil, apricot oil, avocado oil, grapefruit oil, lemon oil, orange oil, mango oil, flax seed oil, fish oil, cocoa butter, hemp oil, castor oil, tall oil, fish oil, cattle fat, buffalo fat, sheep fat, goat fat, duck fat, pig fat, poultry fat, and any combination thereof.

Soybean oil, for example, contains a mixture of saturated and unsaturated fatty acids, predominantly palmitic acid, stearic acid, oleic acid, linoleic acid, and linolenic acid, with the monounsaturated and polyunsaturated fatty acids (oleic acid, linoleic and linolenic acids) comprising a majority of the fatty acids obtainable from the soybean oil. Palm oil contains about 50% saturated fatty acids (palmitic acid, stearic acid, and myristic acid) and 50% unsaturated fatty acids (oleic acid, linoleic acid, and linolenic acid). Coconut oil contains predominantly saturated fatty acids (caprylic acid, capric acid, lauric acid, myristic acid, palmitic acid, and stearic acid) and less than 10% unsaturated fatty acids (oleic acid and linoleic acid).

When glycerol esters are used as a direct (in situ) source of fatty acids for formation of reaction products of the present disclosure, glycerol may be present as the at least one alcohol in compositions containing the reaction products. Optionally, the glycerol may be at least partially removed from the aqueous phase of the compositions, if desired. Otherwise, the amount of glycerol present in the compositions may be dictated by the amount of glycerol ester that is present when forming the reaction product. For example, for glycerol esters containing $C_8$-$C_{24}$ fatty acids, the weight percentage of glycerol in the glycerol esters may range from about 7 wt. % to about 17 wt. %, based on total mass of the glycerol ester. Accordingly, the corresponding weight percentages of glycerol in compositions containing the reaction product, as measured relative to the fatty acid(s) originating from the glycerol upon alkaline hydrolysis, may range from about 7.5 wt. % to about 20 wt. %. Alternately, the weight percentage of glycerol in the compositions may be substantially equivalent on a mass basis, with respect to the entirety of the composition, to the weight percentage of glycerol ester present in the reaction mixture, since each glycerol ester may release one glycerol molecule upon undergoing complete hydrolysis.

An aqueous phase containing the reaction products may be foamed after obtaining the reaction product therein, optionally after combining the reaction product with water and/or adding additional components. As used herein, the term "foam" refers to a stabilized dispersion of a large volume of gas in the form of bubbles of varying sizes in a relatively small volume of liquid. The term "foam quality" refers to the percentage of gas in a volume of foam and may be calculated by dividing the quantity (total foam volume−liquid volume) by the total foam volume. Inducing foam formation of the aqueous phase may take place by agitating the aqueous phase in the presence of a gas, such as through stirring or blending in the presence of the gas, bubbling gas through the aqueous phase, or any combination thereof. The neutral surfactant and/or zwitterionic surfactant may be present in combination with the reaction product while forming the foam.

Ionic surfactants are among the most commonly used type of surfactants for promoting foaming. However, ionic surfactants can lead to incompatibilities with other types of materials, such as divalent ions, and some may be subject to regulatory constraints, especially when used in large quantities. In addition, ionic surfactants may afford inconsistent foam performance at higher temperatures.

Gases suitable for forming a foam in the presence of the reaction products are not believed to be particularly limited. Suitable gases for forming a foam may include, but are not limited to, air, nitrogen, carbon dioxide, helium, natural gas, or any combination thereof. Aerosol propellants may also be used in some instances.

Foams formed according to the disclosure herein may have a foam quality of about 10% or above, or about 20% or above, or about 30% or above, or about 40% or above, or about 50% or above, or about 60% or above, or about 70% or above, or about 80% or above, or about 90% or above. The upper limit of the foam quality may be about 99%, or about 95%, or about 90%, or about 80%, or about 70%, or about 60% or about 50%.

Foamed or foamable agricultural products disclosed herein may comprise an aqueous carrier phase comprising an aqueous carrier fluid, which is described in more detail hereinafter. Foamed formulations (foams) are compositions to which a gas has already been introduced and foam bubbles have formed. That is, foamed formulations may comprise a gas, and an aqueous carrier fluid comprising a composition described herein admixed together with the gas as a plurality of bubbles. Foamable formulations, in contrast, are compositions suitable for forming a foam once a gas has been introduced thereto, but which have not yet formed foam bubbles.

In addition to the reaction products, foamed or foamable formulations may further comprise one or more additional surfactants, which may be cationic, anionic, zwitterionic, neutral, or any combination thereof. Foamed or foamable formulations may also contain additional components found in agricultural products, examples of which will be familiar to persons having ordinary skill in the art. Additional disclosure directed to agricultural products and use thereof are discussed in further detail below.

Reaction products may be provided, sourced, mixed, or stored in solid form or in liquid form. Liquid forms may be disposed in a suitable fluid phase, such as an aqueous phase, which may be emulsified or non-emulsified depending on particular formulations and intended applications. Non-emulsified forms include, but are not limited to, aqueous solutions of the reaction products. In addition, the aqueous phase may be foamed in some instances. As used herein, the terms “fluid” and “fluid phase” refer to both liquids and gels, including solutions, emulsions and suspensions of the reaction products, including foams, unless otherwise indicated. Compositions including a reaction product of the present disclosure may comprise an aqueous carrier fluid. Suitable aqueous carrier fluids may include, for example, fresh water, acidified water, seawater, brine (i.e., a saturated salt solution), or an aqueous salt solution (i.e., a non-saturated salt solution). Water-miscible organic co-solvents such as ethanol or ethylene glycol, for example, may be present in combination with an aqueous carrier fluid, in some embodiments. Up to about 10% co-solvent by volume or up to about 50% co-solvent by volume may be present. Suitable aqueous carrier fluids may be present while forming the reaction products, or an aqueous carrier fluid may be introduced to the reaction products following their formation.

The reaction products of the present disclosure may be incorporated in various agricultural products, as discussed in further detail hereinafter. When used in agricultural products, the reaction products disclosed herein may exert primary functionality (e.g., to promote surface wetting), or they may function in an adjuvant capacity to increase the efficacy or potency of another substance. Illustrative agricultural products are described hereinafter.

A reaction product of a dextrin compound or a dextran and a fatty acid (or fatty ester), as specified above, in combination with a neutral surfactant or a zwitterionic surfactant or a reaction product thereof may be present in agricultural products, such as those containing an agricultural chemical including, for example, herbicides, pesticides, fertilizers, molluscicides, fungicides, plant growth regulators, safeners, or any combination thereof. Suitable examples of these components and not believed to be particularly limited and will be familiar to one having ordinary skill in the art. The reaction products of the disclosure herein may replace a surfactant used in an agricultural product or be used in combination with a surfactant already present in an agricultural product, including partial replacement of an existing surfactant. Within an agricultural product, compositions comprising the reaction products and a surfactant may be present in an amount of about 0.01 wt. % to about 20 wt. % of the agricultural product as a whole, or about 0.1 wt. % to about 10 wt. %, or about 1 wt. % to about 15 wt. %, or about 5 wt. % to about 20 wt. %.

Accordingly, in various embodiments, agricultural products of the present disclosure may comprise an aqueous carrier phase, a neutral surfactant or a reaction product thereof combined with the aqueous carrier phase, and a reaction product of a saccharide polymer (e.g., a dextrin compound, dextran, or any combination thereof) and a fatty acid (or fatty ester) combined with the aqueous carrier phase. Preferably, the reaction product of the saccharide polymer and the fatty acid is highly biodegradable as evaluated by OECD 301B. Optionally, the agricultural products may include an agricultural chemical, such as those specified above.

Some examples of agricultural products comprising a reaction product of a saccharide polymer may include compositions containing another surfactant. Alternately, the neutral or zwitterionic surfactant introduced with the reaction product may constitute the entirety of the surfactants in the agricultural product. Other surfactants may be present in an amount up to about 20 wt. % of the agricultural product.

Some examples of the agricultural products may comprise an oil-in-water emulsion. Other examples of the agricultural products may comprise a water-in-oil emulsion. Still other examples of the agricultural products include all components present in an aqueous solution. Agricultural products of the present disclosure may be delivered by spraying, injection, irrigation, implantation, or other related delivery routes.

In view of the foregoing, the agricultural products described herein may be utilized in various agricultural applications, including soil amendment applications. Methods for amending soil may include: providing a composition comprising an aqueous carrier phase, a neutral surfactant or a reaction product thereof combined with the aqueous carrier phase, and a reaction product of a saccharide polymer and a fatty acid combined with the aqueous carrier phase, the saccharide polymer comprising a dextran, a dextrin compound, or any combination thereof; applying the composition to untreated soil to form an amended soil; and interacting the amended soil with a water-containing fluid, wherein the amended soil absorbs water faster or to a greater extent than does the untreated soil. Preferably, the composition is highly biodegradable as evaluated by OECD 301B. As used herein, the term “untreated soil” refers to any soil that has not previously been contacted with a reaction product of a saccharide polymer and a fatty acid, made according to the disclosure herein. An untreated soil may have been previously contacted with a soil amendment composition other than a reaction product of a saccharide polymer and a fatty acid, but the soil amendment composition did not modify the properties of the soil to a desired degree (e.g., the amount of water absorbed by the soil or the rate of water absorbed by the soil). As used herein, the term "amended soil" refers to a soil that has had its properties enhanced in at least one aspect relative to an untreated soil.

Soils that may be amended with the agricultural products disclosed herein are not considered to be particularly limited. In non-limiting examples, types of soil that may be amended with the agricultural products include, for instance, top soil, potting soil, agricultural soil, sand, clay, loam, peat, combinations thereof, and the like.

The technique through which the agricultural products are contacted with the untreated soil is likewise not considered to be particularly limited. In some examples, the agricultural product may simply be poured or sprayed upon the untreated soil in the untreated soil's native environment (e.g., on the ground). Optionally, the amended soil may be further tilled or mixed after interacting the agricultural product therewith.

Embodiments disclosed herein include:

A. Agricultural products comprising a saccharide polymer reaction product with a fatty acid. The agricultural products comprise: an aqueous carrier phase; a neutral surfactant or a reaction product thereof combined with the aqueous carrier phase; and a reaction product of a saccharide polymer and a fatty acid combined with the aqueous carrier phase, the saccharide polymer comprising a dextran, a dextrin compound, or any combination thereof; wherein the reaction product of the saccharide polymer and the fatty acid is highly biodegradable as evaluated by OECD 301B.

A1. The composition of A, wherein the saccharide polymer comprises dextran.

A2. The composition of A, wherein the saccharide polymer comprises a dextrin compound, preferably maltodextrin.

B. A soil conditioning method comprising: providing a composition comprising an aqueous carrier phase, a neutral surfactant or a reaction product thereof combined with the aqueous carrier phase, and a reaction product of a saccharide polymer and a fatty acid combined with the aqueous carrier phase, the saccharide polymer comprising a dextran, a dextrin compound, or any combination thereof; applying the composition to untreated soil to form an amended soil; and interacting the amended soil with a water-containing fluid, wherein the amended soil absorbs water faster or to a greater extent than does the untreated soil.

B1. The soil conditioning method of B, wherein the saccharide polymer comprises dextran.

B2. The soil conditioning method of B, wherein the saccharide polymer comprises a dextrin compound, preferably maltodextrin.

Embodiments A, A1, A2, B, B1 and B2 may have one or more of the following additional elements in any combination.

Element 1: wherein the agricultural product further comprises an agricultural chemical.

Element 2: wherein the agricultural chemical comprises at least one substance selected from the group consisting of a herbicide, a pesticide, a fertilizer, a molluscicide, a fungicide, a plant growth regulator, a safener, and any combination thereof.

Element 3: wherein the saccharide polymer comprises a dextrin compound and the dextrin compound comprises a maltodextrin.

Element 4: wherein the maltodextrin has a dextrose equivalent value of about 3 to about 25.

Element 4A: wherein the maltodextrin has a dextrose equivalent value of about 4.5 to about 7.0.

Element 4B: wherein the maltodextrin has a dextrose equivalent value of about 9.0 to about 12.0.

Element 5: wherein the fatty acid comprises about 4 to about 30 carbon atoms.

Element 5A: wherein the fatty acid comprises about 95 wt. % or above straight-chain fatty acids having about 4 to about 30 carbon atoms, based on total fatty acids.

Element 5B: wherein the fatty acid consists of one or more straight-chain fatty acids having about 4 to about 30 carbon atoms.

Element 6: wherein the fatty acid comprises at least one fatty acid selected from the group consisting of butyric acid, valeric acid, caproic acid, enanthic acid, caprylic acid, pelabonic acid, capric acid, undecylic acid, lauric acid, tridecylic acid, myristic acid, pentadecylic acid, palmitic acid, margaric acid, stearic acid, nonadecylic acid, arachidic acid, heneicosylic acid, behenic acid, trioscylic acid, lignoceric acid, pentacosylic acid, cerotic acid, carboceric acid, montanic acid, nonacosylic acid, melissic acid, crotonic acid, cervonic acid, linoleic acid, linolelaidic acid, linolenic acid, arachidonic acid, docosatetraenoic acid, myristoleic acid, palmitoleic acid, sappenic acid, vaccenic acid, paullinic acid, oleic acid, pinolenic acid, stearidonic acid, eleostearic acid, elaidic acid, gondoic acid, gadoleic acid, erucic acid, eicosenoic acid, eicosadiencoic acid, eicosatrienoic acid, eicosatetraenoic acid, docosadienoic acid, nervonic acid, mead acid, adrenic acid, and any combination thereof.

Element 7: wherein the neutral surfactant comprises a fatty acid alkanolamide or a reaction product thereof.

Element 7A: wherein the neutral surfactant comprises cocamide diethanolamine or a reaction product thereof.

Element 8: wherein a molar ratio of fatty acid to saccharide polymer in the reaction product is about 0.2 or above on a basis of $moles_{fatty\ acid}$:$moles_{glucose\ monomers}$.

Element 8A: wherein a molar ratio of fatty acid to saccharide polymer in the reaction product is about 0.2 to about 0.9 on a basis of $moles_{fatty\ acid}$:$moles_{glucose\ monomers}$.

Element 9: wherein the agricultural product is foamed or foamable.

Element 10: wherein the agricultural product is emulsified.

Element 11: wherein the reaction product of the saccharide polymer and the fatty acid is highly biodegradable as evaluated by OECD 301B.

Element 12: wherein the reaction product of the saccharide polymer and the fatty acid originates by reacting the saccharide polymer with a fatty ester to form the fatty acid.

Element 13: wherein the fatty ester comprises a glycerol ester comprising up to three types of carboxylic acids each having about 4 to about 30 carbon atoms.

Element 14: wherein the agricultural product further comprises glycerol.

Element 15: wherein the agricultural product further comprises a zwitterionic surfactant.

By way of non-limiting example, exemplary combinations applicable to A, A1, A2, B, B1 and B2 include, but are not limited to: 1 and 2; 1-3; 1 and 3; 1 and 5 (or 5A or 5B); 1, 2 and 5 (or 5A or 5B); 1, 2 and 6; 1 and 6; 1, 2, and 7 or 7A; 1, and 7 or 7A; 1, and 8 or 8A; 1, and 9 or 10; 1, 2, and 9 or 10; 3 and 5 (or 5A or 5B); 3 and 6; 3, and 7 or 7A; 3, and 8 or 8A; 3, and 9 or 10; 5 (or 5A or 5B), and 7 or 7A; 6, and 7 or 7A; 6, and 9 or 10; 5 (or 5A or 5B), and 9 or 10; 9 and 11; and 10 and 11.

To facilitate a better understanding of the disclosure herein, the following examples of various representative embodiments are given. In no way should the following examples be read to limit, or to define, the scope of the invention.

EXAMPLES

Surface tension (ST) measurements below were performed using a Bolin Scientific Tensiometer at room temperature, except where indicated as being performed using ASTM D1331. Surface tension measurements performed using ASTM D1331 were conducted by diluting an as-produced sample to 0.25 vol. % in distilled water. Otherwise, the surface tension measurements were performed using as-produced samples or processing samples as specified in the examples below.

Comparative Example 1: Acid-Catalyzed Reaction of Maltodextrin with Lauric Acid. A solution containing 10 wt. % maltodextrin (MALTRIN M100, DE=9.0-12.0, 30% active solution) and 6.18 wt. % lauric acid was prepared in DMSO. Five drops of phosphoric acid were added, and the reaction mixture was heated at 110° C. for 3 hours. The reaction product was precipitated by adding 3 volumes of isopropyl alcohol, and a white precipitate was collected by decantation and dried. The product was characterized by FTIR and $^{1}$H NMR.

The spectral characterization was consistent with conversion of maltodextrin into a reaction product.

For surface tension measurements (Table 2), the isolated reaction product was redissolved at a concentration of 13.17 wt. % in the presence of 5 wt. % cocamide diethanolamine (CocoDEA) and 6 wt. % sodium dodecylbenzene sulfonate (SDDBS).

Comparative Example 2: Acid Chloride-Based Reaction of Maltodextrin. A solution containing 10 wt. % maltodextrin (MALTRIN M100, DE=9.0-12.0, 30% active solution) and 6.75 wt. % lauroyl chloride was prepared in formamide. A few drops of phosphoric acid were added, and the reaction mixture was heated at 105° C. for 2 hours. The reaction product was precipitated by adding 3 volumes of isopropyl alcohol, and an amber tar-like fluid was obtained. The product was characterized by FTIR and 1H NMR. The spectral characterization was consistent with conversion of maltodextrin into a reaction product.

For surface tension measurements (Table 2), the isolated reaction product was redissolved at a concentration of 13.17 wt. % in the presence of 5 wt. % cocamide diethanolamine (CocoDEA) and 6 wt. % sodium dodecylbenzene sulfonate (SDDBS).

Example 1A: General Procedure for Preparation of Reaction Products of Maltodextrin Under Basic Conditions. 296.25 g water, 25.00 g cocamide diethanolamine (CocoDEA), and 10.00 g KOH (45% active solution) were combined. The reaction mixture was mechanically stirred and heated to 65° C. Thereafter, 18.75 g fatty acid and 150.0 g maltodextrin (MALTRIN M100, Grain Processing Corporation, Muscatine, Iowa; DE=9.0-12.0) as a 30% active solution were added to the reaction mixture. Once the maltodextrin dissolved, heating was discontinued and stirring was conducted until the reaction mixture reached room temperature. Reaction products were used without further processing below. Table 1A shows the maltodextrin reaction products synthesized as above and tested in the subsequent examples. Caprylic acid is synonymous with octanoic acid, lauric acid is synonymous with dodecanoic acid, and stearic acid is synonymous with octadecanoic acid.

TABLE 1A

| Sample | Fatty Acid | Molar Ratio Fatty Acid:Maltodextrin (as Glucose Monomer) |
|---|---|---|
| A | Butyric Acid | 0.77 |
| B | Caprylic Acid | 0.47 |
| C | Lauric Acid | 0.34 |
| D | Stearic Acid | 0.24 |

The general synthetic procedure was followed for all but Sample A. For Sample A, 27.5 g KOH (45% active) and 278.75 g water were used, and the other reaction parameters remained the same. All calculated molar ratios assume that the entirety of the maltodextrin (or dextran) has the molecular weight of glucose (180.16 g/mol) less the molecular weight of water (18.02 g/mol)=162.14 g/mol.

Additional samples were synthesized using the general procedure of Example 1A at set ratios of fatty acid to maltodextrin, as specified in Table 1B below.

TABLE 1B

| Sample | Fatty Acid | Weight Ratio Fatty Acid:Weight Maltodextrin | Molar Ratio Fatty Acid:Maltodextrin (as Glucose Monomer) |
|---|---|---|---|
| A1 | Butyric Acid | 1:10 | 0.61 |
| A2 | Butyric Acid | 1:4 | 1.53 |
| A3 | Butyric Acid | 1:2 | 3.07 |
| A4 | Butyric Acid | 1:1 | 6.13 |
| B1 | Caprylic Acid | 1:10 | 0.37 |
| B2 | Caprylic Acid | 1:4 | 0.94 |
| B3 | Caprylic Acid | 1:2 | 1.87 |
| B4 | Caprylic Acid | 1:1 | 3.75 |
| C1 | Lauric Acid | 1:10 | 0.27 |
| C2 | Lauric Acid | 1:4 | 0.67 |
| C3 | Lauric Acid | 1:2 | 1.35 |
| C4 | Lauric Acid | 1:1 | 2.70 |
| D1 | Stearic Acid | 1:10 | 0.21 |
| D2 | Stearic Acid | 1:4 | 0.53 |
| D3 | Stearic Acid | 1:2 | 1.05 |
| D4 | Stearic Acid | 1:1 | 2.11 |
| I1 | Palmitic Acid | 1:10 | 0.19 |
| I2 | Palmitic Acid | 1:4 | 0.47 |
| I3 | Palmitic Acid | 1:2 | 0.95 |
| I4 | Palmitic Acid | 1:1 | 1.90 |

Example 1B: Alternative Procedure for Preparation of Reaction Products of Maltodextrin Under Basic Conditions. A solution containing 10 wt. % maltodextrin (MALTRIN M100, DE=9.0-12.0, 30% active solution), 6.18 wt. % lauric acid, and 1.73 wt. % KOH was prepared in water. The reaction mixture was then heated at 65° C. for 30 minutes. The reaction product was precipitated by adding 3 volumes of isopropyl alcohol, and a white precipitate was collected by decantation and dried. The product was characterized by FTIR and 1H NMR. The spectral characterization was consistent with conversion of maltodextrin into a reaction product. Other fatty acids may be reacted similarly.

For surface tension measurements using samples obtained by Example 1B (Table 2), the isolated reaction product was redissolved at a concentration of 13.17 wt. % in the presence of 5 wt. % cocamide diethanolamine (CocoDEA) and 6 wt. % sodium dodecylbenzene sulfonate (SDDBS).

Example 2: General Procedure for Preparation of Reaction Products of Dextran Under Basic Conditions. Reaction products were formed from dextran in a similar manner to that described above using the general procedure for maltodextrin. The dextran had a molecular weight of 500,000 and an activity level of 9% within a solution thereof. Table 1C shows the dextran reaction products synthesized as above and tested in the subsequent examples.

TABLE 1C

| Sample | Fatty Acid | Weight Ratio Fatty Acid:Weight Dextran | Molar Ratio Fatty Acid:Dextran (as Glucose Monomer) |
|---|---|---|---|
| E1 | Caprylic Acid | 1:10 | 0.11 |
| E2 | Caprylic Acid | 1:5 | 0.22 |
| E3 | Caprylic Acid | 1:2 | 0.57 |
| E4 | Caprylic Acid | 1:1 | 1.13 |
| F1 | Lauric Acid | 1:10 | 0.081 |
| F2 | Lauric Acid | 1:5 | 0.16 |
| F3 | Lauric Acid | 1:2 | 0.41 |
| F4 | Lauric Acid | 1:1 | 0.81 |
| G1 | Palmitic Acid | 1:10 | 0.063 |
| G2 | Palmitic Acid | 1:5 | 0.13 |
| G3 | Palmitic Acid | 1:2 | 0.32 |
| G4 | Palmitic Acid | 1:1 | 0.63 |
| H1 | Stearic Acid | 1:10 | 0.057 |
| H2 | Stearic Acid | 1:5 | 0.11 |
| H3 | Stearic Acid | 1:2 | 0.28 |
| H4 | Stearic Acid | 1:1 | 0.57 |

Characterization of Comparative Examples 1 and 2 in Relation to Example 1B. Table 2 summarizes the surface tension values for the reaction products of Comparative Examples 1 and 2 and the reaction product of Example 1B (alternative preparation under basic conditions) at a concentration of 1 gpt (gallons per thousand gallons), in comparison to control samples containing 5 wt. % CocoDEA or 5 wt. % CocoDEA/6 wt. % SDDBS.

TABLE 2

| Entry | Sample | Surface Tension at 1 gpt (dynes/cm) |
|---|---|---|
| 1 | Control (5 wt. % CocoDEA/ 6 wt. % SDDBS) | 31.26 |
| 2 | Control (5 wt. % CocoDEA) | 34.49 |
| 3 | Comparative Example 1 | 31.77 |
| 4 | Comparative Example 2 | 31.48 |
| 5 | Example 1B | 31.51 |

The control samples and comparative/experimental samples contained identical concentrations of CocoDEA or CocoDEA/SDDBS. As shown, the reaction product prepared under basic conditions (Entry 5) afforded similar performance to that obtained under acidic conditions (Entries 3 and 4). In each case, the surface tension was similar to that of the surfactant-only CocoDEA/SDDBS control (Entry 1). The surface tension values decreased by about 10% relative to a CocoDEA-only control (Entry 2). This surprising result is 10 further elaborated upon below.

The surface tension performance of individual components of the reaction mixture used to produce Sample C were also compared against that of the reaction product itself. Measurements were made at 1 gpt and 2 gpt, as specified in Table 3 below. 15

TABLE 3

| Entry | Component | ST at 1 gpt (dynes/cm) | ST at 2 gpt (dynes/cm) |
|---|---|---|---|
| 1 | maltodextrin (30% active solution) | 73.03 | 72.85 |
| 2 | maltodextrin (30% active solution), 1.7% KOH (45% active solution) and 6.18% lauric acid (heated as above) | n/d | 77.39 |
| 3 | 10% maltodextrin (30% active solution), 5% CocoDEA neutral surfactant solution (heated as above) | 49.23 | 35.89 |
| 4 | 5% CocoDEA neutral surfactant solution (heated as above) | 34.49 | 31.93 |
| 5 | 5% CocoDEA neutral surfactant solution containing 2% KOH (45% active solution) (heated as above) | 36.73 | 35.00 |
| 6 | 5% CocoDEA neutral surfactant solution containing 2.47% lauric acid (heated as above) | 39.88 | 32.99 |
| 7 | 5% CocoDEA neutral surfactant solution containing 2% KOH (45% active solution) and 3.75% lauric acid (heated as above) | 36.52 | 30.40 |
| 8 | Sample C | 28.84 | 28.59 |

As shown, the maltodextrin itself (Entry 1) afforded a very high surface tension in comparison to Sample C (Entry 8). In the absence of CocoDEA, the surface tension remained very high even when other components used to form the reaction product were present (Entry 2). 5 wt. % CocoDEA afforded a much lower surface tension (Entry 4), which increased in the presence of maltodextrin (Entry 3). When other components used to form the reaction mixture (except maltodextrin) were combined with 5 wt. % CocoDEA, the surface tension increased slightly (Entries 4-7) relative to the reaction product. In contrast, when all reaction components were present together in Sample C (Entry 8), the surface tension was lower than any other tested combination of reaction components. The decreased surface tension realized in the presence of the maltodextrin reaction product is particularly surprising, given that maltodextrin by itself increased the surface tension (Entries 3 and 4).

The surface tension values of selected samples from Tables 1A and 1B were determined at 0.25 vol. % in distillated water at room temperature via ASTM D1331. The surface tension values are summarized in Table 4.

TABLE 4

| Sample | Surface Tension at 0.25 vol. % via ASTM D1331 (mN/m) |
|---|---|
| C1 | 32.0 |
| C3 | 26.6 |
| D3 | 36.0 |
| D (diluted 1:3 v/v with distilled water) | 31.3 |
| I2 | 31.8 |

Surface Tension of Dextran Reaction Products. The surface tension performance of the dextran reaction products was measured at 1 gpt and 2 gpt, as specified in Table 5 below.

TABLE 5

| Sample | ST at 1 gpt (dynes/cm) | ST at 2 gpt (dynes/cm) |
|---|---|---|
| E1 | 34.61 | 30.25 |
| E2 | 34.07 | 29.15 |
| E3 | 32.39 | 28.87 |
| E4 | 31.95 | 29.00 |
| F1 | 30.49 | 28.75 |
| F2 | 29.93 | 27.93 |
| F3 | 31.34 | 27.65 |
| F4 | 68.20 | 54.71 |
| G1 | 33.82 | 28.25 |
| G2 | 28.77 | 27.46 |
| G3 | 31.51 | 28.53 |
| G4 | 45.76 | 38.04 |
| H1 | 34.66 | 28.75 |
| H2 | 33.06 | 28.27 |
| H3 | 38.07 | 32.13 |
| H4 | 49.97 | 40.98 |

As shown, all of the dextran reaction products were capable of lowering the surface tension of CocoDEA, at least at some concentrations and fatty acid loadings, in a manner similar to that provided by the maltodextrin reaction products described above. At the highest fatty acid loadings (samples F4, G4 and H4), the ability to lower the surface tension decreased considerably. Thus, the surface tension was tunable depending on the molecular weight of the fatty acid and the extent of fatty acid loading.

Example 3: Substitution of CocoDEA with Betaine Surfactant. Sample C' was prepared in the same manner as Sample C above using the procedure of Example 1A and similar reagent proportions, except substituting a betaine (zwitterionic) surfactant (SOPALEX 360 BET) for CocoDEA and conducting the reaction at 50° C. Table 6 summarizes the surface tension of the reaction product in comparison to the betaine surfactant alone.

TABLE 6

| Sample | ST at 1 gpt (dynes/cm) | ST at 2 gpt (dynes/cm) |
|---|---|---|
| Zwitterionic Surfactant | 71.04 | 64.9 |
| Sample C' | 66.27 | 55.55 |

Substitution of the betaine surfactant for the neutral surfactant CocoDEA afforded high surface tension values at each tested concentration. The betaine surfactant by itself afforded relatively high surface tension values. Surprisingly, the reaction product was operable to decrease the surface tension somewhat in comparison to the betaine surfactant alone.

Example 4: Substitution of CocoDEA with Ethoxylated Alcohol Neutral Surfactant. Sample C" was prepared in the same manner as Sample C above using the procedure of Example 1A and similar reagent proportions, except substituting an ethoxylated alcohol neutral surfactant (Tomadol 1-9) for CocoDEA and conducting the reaction at 50° C. Table 7 summarizes the surface tension of the reaction product in comparison to the ethoxylated alcohol surfactant alone.

TABLE 7

| Sample | ST at 1 gpt (dynes/cm) | ST at 2 gpt (dynes/cm) |
|---|---|---|
| Ethoxylated alcohol surfactant | 46.6 | 39.5 |
| Sample C" | 47.4 | 41.9 |

The ethoxylated alcohol surfactant afforded much higher surface tension values at each tested concentration than did a like concentration of CocoDEA. The reaction product in combination with the ethoxylated alcohol surfactant afforded a similar surface tension to that of the ethoxylated alcohol surfactant alone.

Example 5: Decreased CocoDEA Concentration. Sample C''' was prepared in the same manner as Sample C above using the procedure of Example 1A and similar reagent proportions, except the CocoDEA concentration was lowered to one-fifth the concentration used above (i.e., 1 wt. %). Table 8 summarizes the surface tension of the reaction product in comparison to the reduced-concentration CocoDEA surfactant solution alone.

TABLE 8

| Sample | ST at 1 gpt (dynes/cm) | ST at 2 gpt (dynes/cm) |
|---|---|---|
| CocoDEA at ⅕ concentration | 71.96 | 67.87 |
| Sample C''' | 65.84 | 59.05 |

Lowering the CocoDEA concentration significantly increased the surface tension values. Even though the surface tension was considerably higher than when 5 wt. % CocoDEA was present, the reaction product still decreased the surface tension in comparison to CocoDEA itself.

Example 6: Representative Procedure for Preparation of Maltodextrin Reactions Products Using a Glycerol Ester. 25.00 g fatty acid alkanolamide surfactant and 10.00 g KOH (45% active solution) were combined in water. The reaction mixture was mechanically stirred and heated to 65° C. Thereafter, soybean oil and 150.0 g maltodextrin (MALTRIN M100, Grain Processing Corporation, Muscatine, Iowa; DE=9.0-12.0) as a 30% active solution were added to the reaction mixture. The amount of soybean oil was selected to provide a HLB of either 12 or 16 upon formation of a reaction product. The amount of water was selected to provide a surfactant concentration of 5 wt. %, a fatty ester (oil) concentration of 2.5 wt. %, and a maltodextrin concentration of 10 wt. %, based on all reaction components. Once the maltodextrin dissolved, heating was discontinued and stirring was conducted until the reaction mixture reached room temperature.

Foaming Performance of Dextrin Reaction Products. Sample 1C (reaction product of maltodextrin and lauric acid) was processed into a soap formulation having the following composition: 61.1 wt. % deionized water, 20.9 wt. % maltodextrin/lauric acid reaction product (combined as aqueous mixture prepared as above), 7.5 wt. % cocamidopropyl betaine, 0.5 wt. % glycerin, and 10.0 wt. % SOPALTERIC CS (sodium cocoamphohydroxypropylsulfonate, Southern Chemical and Textile). A comparative soap formulation having the following composition was prepared for side-by-side evaluation of foaming performance: 20 wt. % of a 30 wt. % sodium lauryl sulfate solution in water, 5 wt. % cocoamidopropyl betaine, 0.5 wt. % glycerin, 0.8 wt. % NaCl and balance deionized water. The soap formulations contained approximately equivalent amounts of the maltodextrin/lauric acid reaction product and sodium lauryl sulfate.

Foaming performance of the experimental soap formulation in comparison to the comparative soap formulation was assayed using the Hart-DeGeorge Foam Test. In brief, the Hart-DeGeorge Foam Test utilizes a wire screen placed between a funnel and a graduated cylinder. A set volume of a foamed mixture is then introduced into the funnel, and the time required for the wire screen (850 μm mesh size) to be exposed is measured. The liquid level in the graduated cylinder is also measured at various times. Lower density foams are thus characterized by longer times required to expose the wire screen, and lower amounts of liquid collected in the graduated cylinder are indicative of a more stable foam.

To conduct Hart-DeGeorge Foam Tests with the experimental and comparative soap formulations, 1% active solutions of each soap formulation were prepared in separate 200 mL quantities of deionized water (soft water) at 25° C. The solutions were then blended at high speed in a blender for 1 minute. At the completion of blending, the resulting foam was transferred to the funnel. The time required for the wire mesh to be exposed was measured. In addition, the liquid level in the graduated cylinder was recorded at 1, 2, 3, 4, 5 and 14 minutes. Table 9 summarizes the Hart-DeGeorge Foam Test performance of the experimental and comparative soap formulations.

TABLE 9

| | Comparative Soap Formulation | Experimental Soap Formulation |
|---|---|---|
| Wire Time (s) | 98 | 91 |
| Liquid Volume-1 min. (mL) | 1 | 1 |
| Liquid Volume-2 min. (mL) | 1 | 1 |
| Liquid Volume-3 min. (mL) | 1 | 1 |
| Liquid Volume-4 min. (mL) | 25 | 1 |
| Liquid Volume-5 min. (mL) | 30 | 1 |
| Liquid Volume-14 min. (mL) | 125 | 105 |

Replacement of Ethoxylate Alcohol Surfactants. A reaction product was formed by reacting maltodextrin with a mixture of dodecanoic acid ($C_{12}$ fatty acid) and myristic acid ($C_{14}$ fatty acid) in the presence of CocoDEA under the general conditions specified above. The reaction product was an opaque fluid, and no settling was observed. The reaction product was formulated at a standard concentration (Sample BB), as well as at half the standard concentration and double the standard concentration (Samples AA and CC, respectively). Surface tension, intrafacial tension, and contact angle values for these fluids are specified in Table 10 below.

Surface tension, intrafacial tension, and contact angle values for three friction-reducing fluids containing ethoxylated alcohol surfactants are also shown in Table 10 (Fluids 1-3).

The ethoxylated alcohol surfactants in friction-reducing fluids 1-3 were replaced with an equivalent quantity of reaction product obtained from double-concentration Sample CC. Surface tension, intrafacial tension, and contact angle values for the modified friction reducing fluids are also specified in Table 10. The modified fluids are designated Fluids 1', 2' and 3', respectively.

TABLE 10

| Sample | Concentration (gpt) | Surface Tension (dynes/cm) | Intrafacial Tension (dynes/cm) | Contact Angle (°) |
|---|---|---|---|---|
| AA | 1 | 28.1 | 1.4 | 20.3 |
| | 2 | 28.0 | 0.6 | n/d |
| BB | 1 | 32.7 | 3.4 | 27.2 |
| | 2 | 29.8 | 1.8 | n/d |
| CC | 1 | 40.2 | 7.0 | 39.8 |
| | 2 | 32.8 | 3.8 | n/d |
| Fluid 1 | 1 | 31.66 | 2.02 | 31.3 |
| | 2 | 29.45 | 1.11 | n/d |
| Fluid 2 | 1 | 33.96 | 3.17 | 33.7 |
| | 2 | 30.60 | 2.06 | n/d |
| Fluid 3 | 1 | 30.45 | 1.85 | 30.8 |
| | 2 | 28.76 | 0.98 | n/d |
| Fluid 1' | 1 | 28.25 | 0.36 | 29.6 |
| | 2 | 27.79 | 0.27 | n/d |
| Fluid 2' | 1 | 30.06 | 0.74 | 33.2 |
| | 2 | 28.14 | 0.56 | n/d |
| Fluid 3' | 1 | 28.98 | 0.41 | 28.9 |
| | 2 | 27.79 | 0.30 | n/d |

As shown in Table 10, replacement of the ethoxylated alcohol surfactant in Fluids 1-3 with a reaction product of the present disclosure afforded considerably lower surface tension and intrafacial tension values in each case. Surprisingly, the surface tension and intrafacial tension values were even lower than in the Sample CC reaction product itself. Moreover, the friction-reducing properties of Fluids 1'-3' were not significantly changed from original Fluids 1-3 (data not shown).

Figure 2:
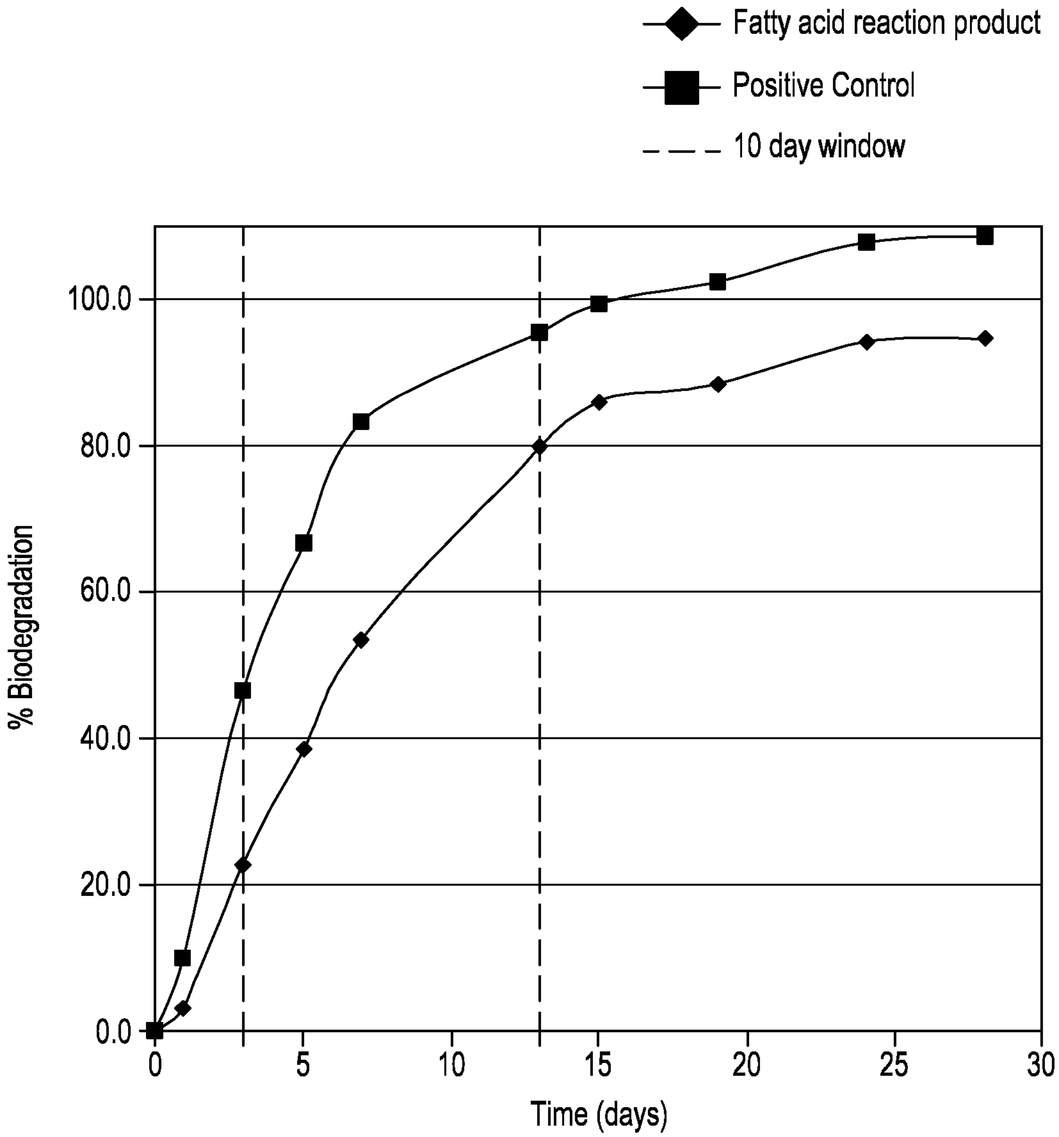

Biodegradation Data. To assess their suitability for agricultural use, two fatty acid reaction products of maltodextrin were tested for biodegradability according to test method OECD 301B-$CO_2$ Evolution Test. Testing was conducted by Respirtek, Inc. (Biloxi, MS). FIGS. 1 and 2 show plots of percent biodegradation for fatty acid reaction products of maltodextrin as function of time relative to a positive control, as measured by OECD 301. The sample shown in FIG. 1 achieved 86.8% biodegradation, and the samples shown in FIG. 2 achieved 94.8% biodegradation. Both samples were categorized as Readily Biodegradable based upon the results of the test.

Water Penetration and Retention Screening. A sandy-loam test soil was obtained from the New Jersey Pine Barrens, a region known to develop water-repellent soils. Soils were sieved, evenly placed inside standard 1020 plastic flats, and air dried to a volumetric water content (VWC) of 10-15%. VWC is defined as the volume of water in a given volume of media. VWC was measured using a WATERSCOUT SM 100 Soil Moisture Sensor connected to a pre-calibrated digital FIELDSCOUT® Soil Sensor Reader (Spectrum Technologies, Inc., Plainfield, IL). Measurements were taken by pushing the sensor directly into the media, maximizing contact between the sensor and media, and recording the VWC percentage reported on the reader.

For water penetration tests, the test soil was evenly loaded into a well plate and the soil was surface smoothed to produce a flat, unconsolidated substrate surface. Droplets of the test sample (30 μL) were placed on the surface of the soil, and the time required for the droplets to completely infiltrate was recorded in seconds. Tests were conducted at an ambient air temperature of approximately 22° C. Testing results are summarized in Table 11.

TABLE 11

| Sample | Mean Wetting Time (s) |
|---|---|
| Control | >100000 |
| A4 (0.1 wt. % in $H_2O$) | >1800 |
| A4 (0.5 wt. % in $H_2O$) | >1800 |
| A4 (1.0 wt. % in $H_2O$) | >1800 |
| B1 (0.1 wt. % in $H_2O$) | >1800 |
| B1 (0.5 wt. % in $H_2O$) | >1800 |
| B1 (1.0 wt. % in $H_2O$) | >1800 |
| B4 (0.1 wt. % in $H_2O$) | >1800 |
| B4 (0.5 wt. % in $H_2O$) | >1800 |
| B4 (1.0 wt. % in $H_2O$) | 330 |
| F1 (0.1 wt. % in $H_2O$) | 72000 |
| F1 (0.5 wt. % in $H_2O$) | 558.2 |
| F1 (1.0 wt. % in $H_2O$) | 210 |

As shown, the reaction products disclosed herein improved water penetration relative to the control (distilled water).

For water retention tests, 400 g of test soil was placed in a 2"×6" clear, plexiglass column fitted with a 2 mm mesh screen bottom secured by a rubber ring. The mesh size was selected to hold the test soil in place while still allowing water to percolate. A ring stand and clamp were used to secure the column above a 1000 ml beaker positioned to catch leachate flowing through the test soil. The test samples were dissolved into water at concentrations ranging from 0.1% to 1.0% by weight and drench-applied to the soil surface. Leachate volume and percentage were calculated 30 minutes after the irrigation event ended for each sample. Distilled water was used as a control. All measurements were conducted at least in triplicate. Testing results are summarized in Table 12.

TABLE 12

| Sample | Mean Water Retention (%) |
|---|---|
| Control | 9.3/9.8 |
| A4 (0.1 wt. % in $H_2O$) | 10.9 |
| A4 (0.5 wt. % in $H_2O$) | 12.4 |
| A4 (1.0 wt. % in $H_2O$) | 15.3 |
| B1 (0.1 wt. % in $H_2O$) | 11.1 |
| B1 (0.5 wt. % in $H_2O$) | 11.8 |
| B1 (1.0 wt. % in $H_2O$) | 12.8 |
| B4 (0.1 wt. % in $H_2O$) | 12.4 |
| B4 (0.5 wt. % in $H_2O$) | 17.2 |
| B4 (1.0 wt. % in $H_2O$) | 24.9 |
| F1 (0.1 wt. % in $H_2O$) | 11.3 |
| F1 (0.5 wt. % in $H_2O$) | 21.3 |
| F1 (1.0 wt. % in $H_2O$) | 34.8 |

As shown, the reaction products disclosed herein improved moisture retention relative to controls.

Formulation with Glyphosphate Herbicide. A 41% solution of glyphosphate herbicide was prepared with 10 wt. % Sample B3 as a direct replacement for alkoxylated fatty amine surfactant. The modified herbicide formulation was applied to King Ranch bluestem, common Bermuda grass, St. Augustine grass, Pensacola bahia grass, and common carpet grass. Greater than 95% control of these grasses was realized.

A 41% solution of glyphosphate herbicide was prepared with 5, 10, and 20 wt. % Sample D3 as a direct replacement for alkoxylated fatty amine surfactant. The modified herbicide formulations were applied to smooth crabgrass, common lespedeza, sprawling horseweed, and common Bermuda grass. Near 100% control of these grasses was realized in all cases.

Unless otherwise indicated, all numbers expressing quantities and the like in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

One or more illustrative embodiments incorporating various features are presented herein. Not all features of a physical implementation are described or shown in this application for the sake of clarity. It is understood that in the development of a physical embodiment incorporating the embodiments of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art and having benefit of this disclosure.

While various systems, compositions, tools and methods are described herein in terms of "comprising" various components or steps, the systems, compositions, tools and methods can also "consist essentially of" or "consist of" the various components and steps.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Therefore, the disclosed systems, compositions, tools and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems, compositions, tools and methods illustratively disclosed herein may suitably be practiced in the absence of any element that is not specifically disclosed herein and/or any optional element disclosed herein. While systems, compositions, tools and methods are described in terms of "comprising," "containing," or "including" various components or steps, the systems, tools and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, “from about a to about b,” or, equivalently, “from approximately a to b,” or, equivalently, “from approximately a-b”) disclosed herein is to be understood to set forth every number and range encompassed within the broader range of values. Also, the terms in the claims have their plain, ordinary meaning unless otherwise explicitly and clearly defined by the patentee. Moreover, the indefinite articles “a” or “an,” as used in the claims, are defined herein to mean one or more than one of the elements that it introduces. If there is any conflict in the usages of a word or term in this specification and one or more patent or other documents that may be incorporated herein by reference, the definitions that are consistent with this specification should be adopted.

What is claimed is the following:

1. An agricultural product comprising:

an aqueous carrier phase;

a neutral surfactant combined with the aqueous carrier phase; and a reaction product of a saccharide polymer and a fatty acid combined with the aqueous carrier phase, the saccharide polymer comprising a dextran, a dextrin compound having a dextrose equivalent of about 3 to about 25, or any combination thereof;

wherein a molar ratio of fatty acid to saccharide polymer in the reaction product is 0.2 to 0.9 on a basis of $moles_{fatty\ acid}:moles_{glucose\ monomers}$; and wherein the reaction product of the saccharide polymer and the fatty acid is highly biodegradable as evaluated by OECD 301B.

2. The agricultural product of claim 1, further comprising: an agricultural chemical.

3. The agricultural product of claim 2, wherein the agricultural chemical comprises at least one substance selected from the group consisting of a herbicide, a pesticide, a fertilizer, a molluscicide, a fungicide, a plant growth regulator, a safener, and any combination thereof.

4. The agricultural product of claim 2, wherein the fatty acid comprises about 95 wt. % or above straight-chain fatty acids having about 4 to about 30 carbon atoms, based on total fatty acids.

5. The agricultural product of claim 1, wherein the saccharide polymer comprises a dextrin compound and the dextrin compound comprises a maltodextrin.

6. The agricultural product of claim 1, wherein the fatty acid consists of one or more straight-chain fatty acids having about 4 to about 30 carbon atoms.

7. The agricultural product of claim 1, wherein the neutral surfactant comprises a fatty acid alkanolamide.

8. The agricultural product of claim 7, wherein the fatty acid alkanolamide comprises a compound selected from the group consisting of cocamide diethanolamine, cocamide monoethanolamine, cocamide diisopropanolamine, palmitic amide diethanolamine, palmitic amide monoethanolamine, palmitic amide diisopropanolamine, and any combination thereof.

9. The agricultural product of claim 1, wherein the agricultural product is foamed or foamable.

10. The agricultural product of claim 1, wherein the agricultural product is emulsified.

11. The agricultural product of claim 1, further comprising:

a zwitterionic surfactant.

12. A method comprising:

providing a composition comprising an aqueous carrier phase, a neutral surfactant combined with the aqueous carrier phase, and a reaction product of a saccharide polymer and a fatty acid combined with the aqueous carrier phase, the saccharide polymer comprising a dextran, a dextrin compound having a dextrose equivalent of about 3 to about 25, or any combination thereof;

wherein a molar ratio of fatty acid to saccharide polymer in the reaction product is 0.2 to 0.9 on a basis of $moles_{fatty\ acid}:moles_{glucose\ monomers}$;

applying the composition to untreated soil to form an amended soil; and interacting the amended soil with a water-containing fluid, wherein the amended soil absorbs water faster or to a greater extent than does the untreated soil.

13. The method of claim 12, wherein the saccharide polymer comprises a dextrin compound and the dextrin compound comprises a maltodextrin.

14. The method of claim 12, wherein the fatty acid consists of one or more straight-chain fatty acids having about 4 to about 30 carbon atoms.

15. The method of claim 12, wherein the neutral surfactant comprises a fatty acid alkanolamide.

16. The method of claim 12, wherein the fatty acid alkanolamide comprises a compound selected from the group consisting of cocamide diethanolamine, cocamide monoethanolamine, cocamide diisopropanolamine, palmitic amide diethanolamine, palmitic amide monoethanolamine, palmitic amide diisopropanolamine, and any combination thereof.

17. The method of claim 12, wherein the composition further comprises an agricultural chemical.

18. The method of claim 17, wherein the agricultural chemical comprises at least one substance selected from the group consisting of a herbicide, a pesticide, a fertilizer, a molluscicide, a fungicide, a plant growth regulator, a safener, and any combination thereof.

19. The method of claim 12, wherein the reaction product of the saccharide polymer and the fatty acid is highly biodegradable as evaluated by OECD 301B.

* * * * *